United States Patent
Da Paz Pontes et al.

(10) Patent No.: US 11,200,255 B2
(45) Date of Patent: Dec. 14, 2021

(54) ROBUST DATA SYNCHRONIZATION SOLUTION BETWEEN DATABASES

(71) Applicant: ADP, LLC, Roseland, NJ (US)

(72) Inventors: Daniel Rodrigo Da Paz Pontes, Porto Alegre (BR); Deepak Kaushal, Roseland, NJ (US); Zhitao Xu, Roseland, NJ (US); Muhammad Nuri, Roseland, NJ (US); Eliezer Madeira de Campos, Porto Alegre (BR); Lili Zhang, Roseland, NJ (US); Kushal Gohil, Roseland, NJ (US); Srilatha Usike, Roseland, NJ (US); Supraja Kanapala, Roseland, NJ (US); Jayesh Patel, Roseland, NJ (US); Manish Patel, Roseland, NJ (US); Tushar Phondge, Roseland, NJ (US); Vincent Civetta, Roseland, NJ (US); Frank Villavicencio, Roseland, NJ (US)

(73) Assignee: ADP, LLC, Roseland, NJ (US)

( * ) Notice: Subject to any disclaimer, the term of this patent is extended or adjusted under 35 U.S.C. 154(b) by 151 days.

(21) Appl. No.: 16/548,191

(22) Filed: Aug. 22, 2019

(65) Prior Publication Data
US 2021/0056124 A1     Feb. 25, 2021

(51) Int. Cl.
*G06F 16/27* (2019.01)
*G06F 16/25* (2019.01)
*G06F 16/23* (2019.01)

(52) U.S. Cl.
CPC ........ *G06F 16/273* (2019.01); *G06F 16/2365* (2019.01); *G06F 16/258* (2019.01)

(58) Field of Classification Search
CPC ... G06F 16/273; G06F 16/258; G06F 16/2365
USPC .......................................................... 707/613
See application file for complete search history.

(56) References Cited

U.S. PATENT DOCUMENTS

| | | | |
|---|---|---|---|
| 6,779,002 B1 | 8/2004 | Mwaura | |
| 2002/0059299 A1* | 5/2002 | Spaey | G06F 16/27 |
| 2002/0069192 A1* | 6/2002 | Aegerter | G06F 16/211 |
| 2003/0145021 A1* | 7/2003 | Parkkinen | G06F 16/27 |
| 2004/0010510 A1 | 1/2004 | Hotti | |
| 2004/0024795 A1* | 2/2004 | Hind | G06F 16/275 |

(Continued)

FOREIGN PATENT DOCUMENTS

CN   109815028 A   5/2019

OTHER PUBLICATIONS

Vassev, "Enterprise Multi-Branch Database Synchronization with MSMQ," A Technical Article, Apr. 2001, 12 pages. https://pdfs.semanticscholar.org/e60b/13b3742a7a11ea5fd09b554f494433299480.pdf.

(Continued)

*Primary Examiner* — James Trujillo
*Assistant Examiner* — Fariborz Khoshnoodi
(74) *Attorney, Agent, or Firm* — Yee & Associates, P.C.

(57) ABSTRACT

Synchronizing data across databases comprising generating a synchronization event in response to a change in source data in a source database. The synchronization event is published as a message in a source database internal queue. The message is then published in a message broker. Sink data in a sink database is synchronized according to the message in the message broker to match the change in source data in the source database.

21 Claims, 7 Drawing Sheets

(56) References Cited

U.S. PATENT DOCUMENTS

| | | | |
|---|---|---|---|
| 2005/0044197 A1* | 2/2005 | Lai | H04L 67/16 709/223 |
| 2005/0049945 A1* | 3/2005 | Bourbonnais | G06F 16/27 705/30 |
| 2013/0332414 A1* | 12/2013 | Frerking | G06F 16/178 707/613 |
| 2014/0236894 A1* | 8/2014 | Hoffman | G06F 16/2365 707/631 |
| 2015/0278323 A1* | 10/2015 | Melahn | G06F 16/178 707/610 |
| 2016/0117304 A1* | 4/2016 | Graham | H04L 67/1097 715/224 |
| 2016/0306864 A1* | 10/2016 | Estes, Jr. | G06F 16/27 |
| 2019/0171650 A1 | 6/2019 | Botev et al. | |

OTHER PUBLICATIONS

Lu et al., "A Method of Data Synchronization Based on Message Oriented Middleware and Xml in Distributed Heterogeneous Environments," International Conference on Aililicial Intelligence and Industrial Engineering (AIIE 2015), pp. 210-212.

MongoDB, "RDBMS to MongoDB Migration Guide," A MongoDB White Paper, Jun. 2016, copyright 2016, 19 pages.

* cited by examiner

ROBUST DATA SYNCHRONIZATION SOLUTION BETWEEN DATABASES

BACKGROUND INFORMATION

1. Field

The present disclosure relates generally to an improved computer system and, in particular, to synchronization of data across databases to achieve continuous two-way data consistency between systems in real-time.

2. Background

Large scale data migration between older relational databases and new document-based databases requires accommodating different data structures between the databases. In addition, maintaining data consistency between the two disparate data stores might be required over time as operations are gradually transitioned between systems.

SUMMARY

An illustrative embodiment provides a computer-implemented method for synchronizing data across databases. The method comprises generating a synchronization event in response to a change in source data in a source database and publishing the synchronization event as a message in a source database internal queue. The message is then published in a message broker. Sink data in a sink database is synchronized according to the message in the message broker to match the change in source data in the source database.

Another illustrative embodiment provides a system for synchronizing data across databases. The system comprising a number of bus systems, a number of storage device connected to the number of bus systems, wherein the number of storage devices store program instructions, and a number of processors connected to the number of bus systems, wherein the number of processors execute the program instructions to: generate a synchronization event in response to a change in source data in a source database; publish the synchronization event as a message in a source database internal queue; publish the message in a message broker; and synchronize sink data in a sink database according to the message in the message broker to match the change in source data in the source database.

Another illustrative embodiment provides a computer program product for synchronizing data across databases. The computer program product comprises a number of non-volatile computer readable storage media having program instructions embodied therewith, the program instructions executable by a number of processors to cause a number of computers to perform the steps of: generating a synchronization event in response to a change in source data in a source database; publishing the synchronization event as a message in a source database internal queue; publishing the message in a message broker; and synchronizing sink data in a sink database according to the message in the message broker to match the change in source data in the source database.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that transitioning data between older and newer databases often involve different data structures between the databases, e.g., migrating data from a relational database such as Oracle® to a document-oriented database such as MongoDB®.

The illustrative embodiments further recognize and take into account that transitioning between disparate data stores can often result in service downtime.

Illustrative embodiments provide a method and system for synchronizing data across databases. Illustrative embodiments enable a one-time, large-scale migration of data between disparate databases. Real-time monitoring and tracing between data from multiple sources also enables continuous two-way synchronization to maintain data consistency between the databases with no service downtime.

Data is divided into different domains that match the new system. Queues are set up in the source database by domain to connect with a message broker on the new system side. Whenever there is a data change transaction on the data in question it is published as a synchronization event in the queue. On the new system (sink database) side, reactors are deployed to receive the concerned synchronization events and then store the data change to the sink database.

The correlation of each data entity between the source and sink database can be accomplished by using a Universal Unique Identifier (UUID) as the primary key. The UUID can be created when a data entity is created. The UUID can be used to track a data entity from its source through the migration framework all the way to the destination (sink database). This approach helps provide key performance indicators and a live trace. A monitor can evaluate the system in real time by monitoring the databases and watching for any discrepancies between them.

For existing data, the UUID for each data entity can be pre-populated. A dedicated stored procedure coupled with Spring Batch implementation can be used to trigger the existing one-time data migrations by domain and by pre-defined size to allow large data flow from one system to another in a controlled way.

Figure 1:
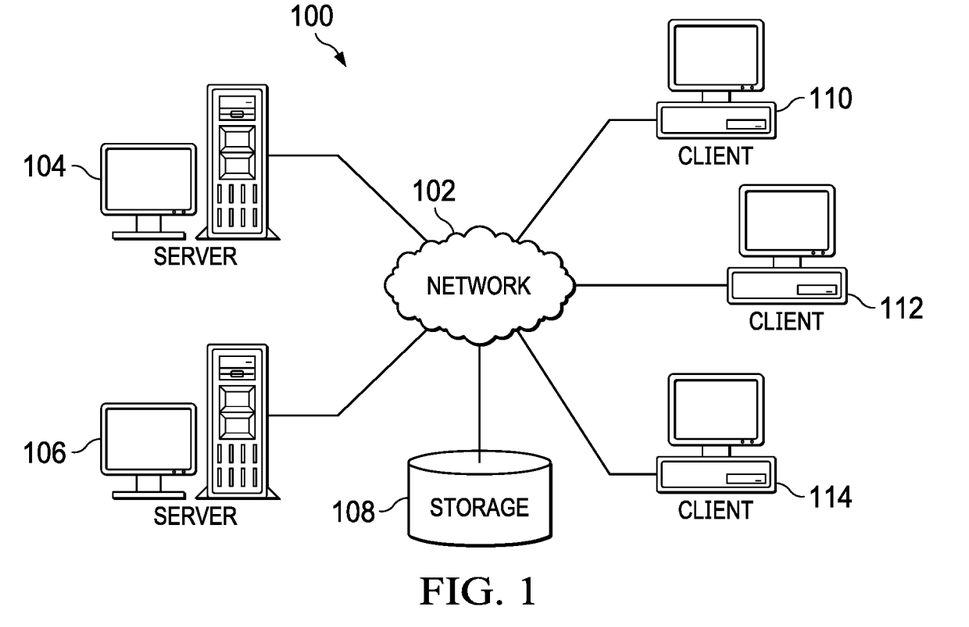
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
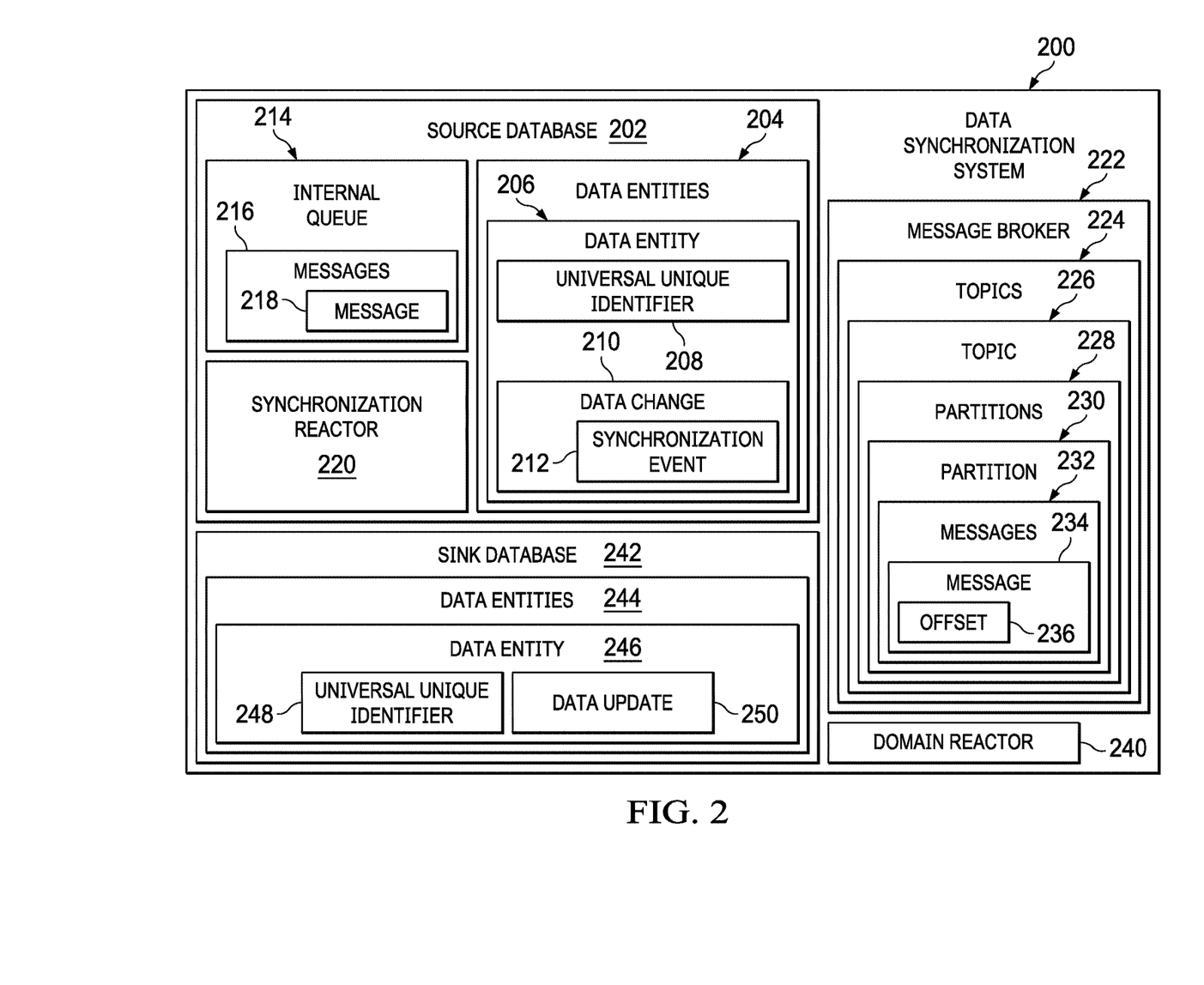
FIG. 2 is a block diagram of a computer system for synchronizing data across databases in accordance with an illustrative embodiment.

Turning to FIG. 2, a block diagram of a computer system for synchronizing data across databases is depicted in accordance with an illustrative embodiment. Data synchronization system 200 comprises a source database 202. The source database 202 stores a number of data entities 204. In an embodiment, each data entity 206 is assigned a UUID 208 to facilitate correspondence with the sink database 242. Each data entity 206 is capable of undergoing a data change 210. The source database 202 generates a synchronization event 212 for each such data change 210. Examples of data changes include write, add, and delete.

An internal queue 214 in the source database 202 stores each synchronization event 212 as a message 218 in a group of messages 216. A synchronization reactor 220 is configured to detect the synchronization event 212 and publish it to a message broker 222. In some cases the source database 202 might use a different data format that the sink database 242, in which case the synchronization reactor 220 can convert the data format of the messages 216 from the first data format of the source database 202 to the second data format of the sink database 242 before pushing the messages to the message broker 222. For example, the data might be converted from Extensible Markup Language (XML) to JavaScript Object Notation (JSON).

Figure 5:
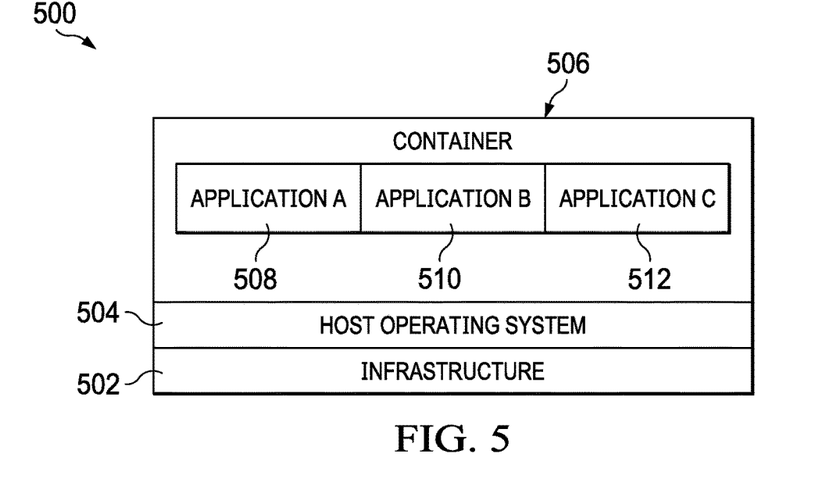
FIG. 5 is a diagram of containerized applications which can be implemented with illustrative embodiments.

In an embodiment, the synchronization reactor 220 can be implemented as a Spring Boot® application in a Docker® container (see FIG. 5). In the example shown in FIG. 2, the synchronization reactor 220 is internal to the source database 202. This can be implemented, e.g., in an Oracle® database. However, it should be emphasized that in some embodiments, the synchronization reactor 220 can also be external to the source database 202.

The message broker 222 can be implemented as an Apache Kafka broker. Kafka messaging systems are often implemented as clusters comprising a number of servers (Kafka brokers). For ease of illustration, FIG. 2 only depicts a single message broker, message broker 222.

The message broker 222 can be divided into a number of topics 224. A topic is a category to which messages are stored and published. All Kafka messages are arranged into topics. A single message broker might contain one or more topics. Alternatively, a topic might also be distributed across multiple brokers in a cluster (not shown).

Each topic 226 is divided into a number of partitions 228 that contain messages 232 in an unchanged sequence. Each message 234 in a partition 230 is assigned and identified by a unique offset 236, also known as a position.

A domain reactor 240 is configured to detect messages 232 in the message broker 222 and synchronize data in the sink database 242 according to a message 234 in the message broker 222 to match the change in data in the source database 202. Like the synchronization reactor 220, the domain reactor 240 can be implemented as a Spring Boot® application in a Docker® container.

The sink database 242 is the destination of the data update synchronization. The sink database 242 comprises a number of data entities 244 corresponding to data entities 204 in the source database 202. Each data entity 246 in the sink database 242 has a UUID 248 that corresponds to a UUID 208 in the source database 202, facilitating correlation between data entities 204 and data entities 244. The domain reactor 240 performs a data update 250 in data entity 246 corresponding to the data change 210 in data entity 206.

Figure 3A:
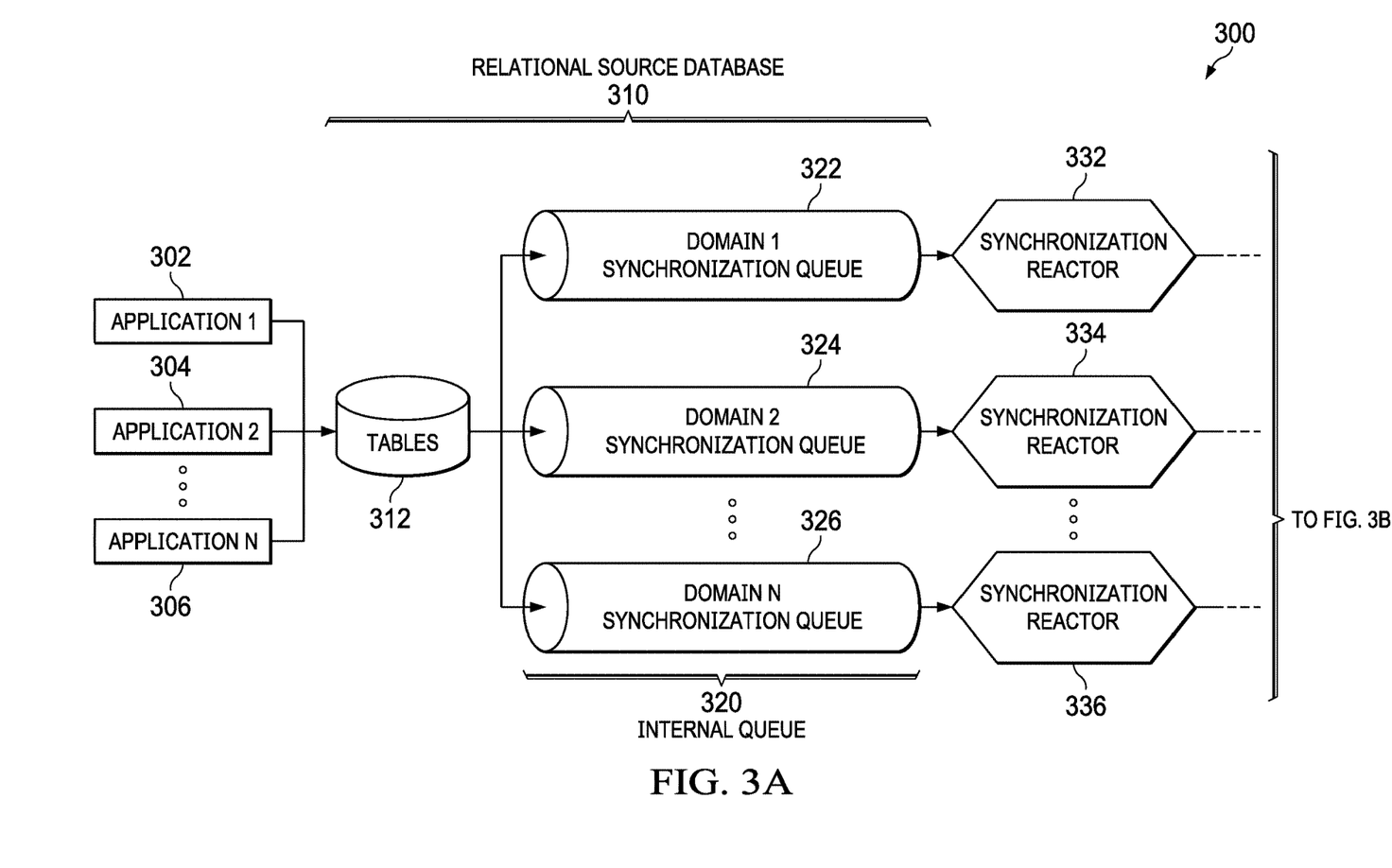
FIGS. 3A and 3B are a block diagram illustrating the operation of a data synchronization system with a relational database as the source and a document-based database as the sink in accordance with an illustrative embodiment.
Figure 3B:
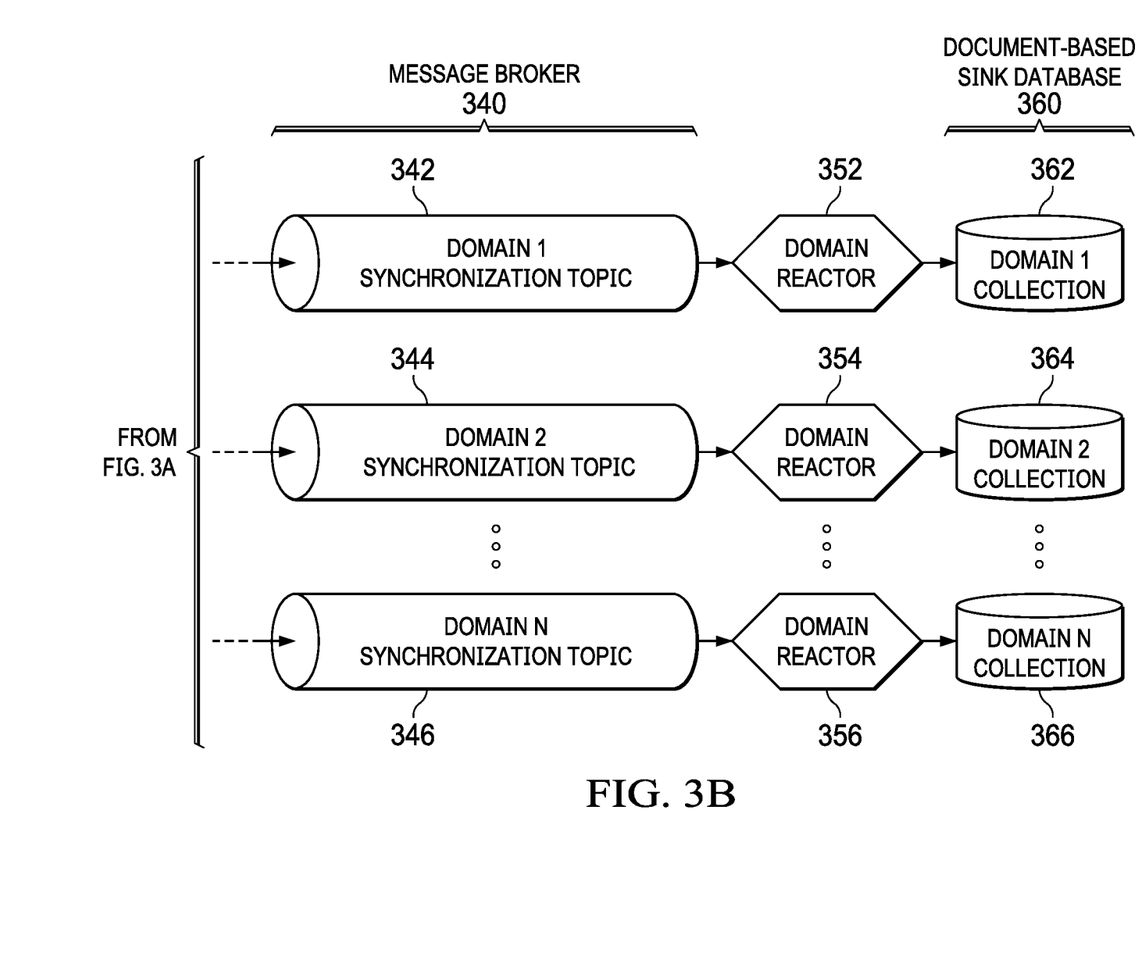

FIGS. 3A and 3B are a block diagram illustrating the operation of a data synchronization system with a relational database as the source and a document-based database as the sink in accordance with an illustrative embodiment. System 300 can comprise the elements of data synchronization system 200 in FIG. 2.

A number of applications 302, 304, 306 generate data changes (e.g., write, add, delete, etc.) within the source database 310. The data changes are recorded in source database tables 312 and create synchronization events that are published as messages in a source database internal queue 320. Source database internal queue 320 is divided into a number of domains 322, 324, 326.

A number of synchronization reactors 332, 334, 336 consume the messages from the source database internal queue 320 and push the synchronization event messages to a message broker 340. The message broker comprises a number of topics 342, 344, 346 corresponding to domains 322, 324, 326.

Domain reactors 352, 354, 356 consume the messages in the message broker 340 and update data in the sink database 360. Data in the sink database 360 is divided into domain collections 362, 364, 366 corresponding to domains in source database 310.

Figure 4:
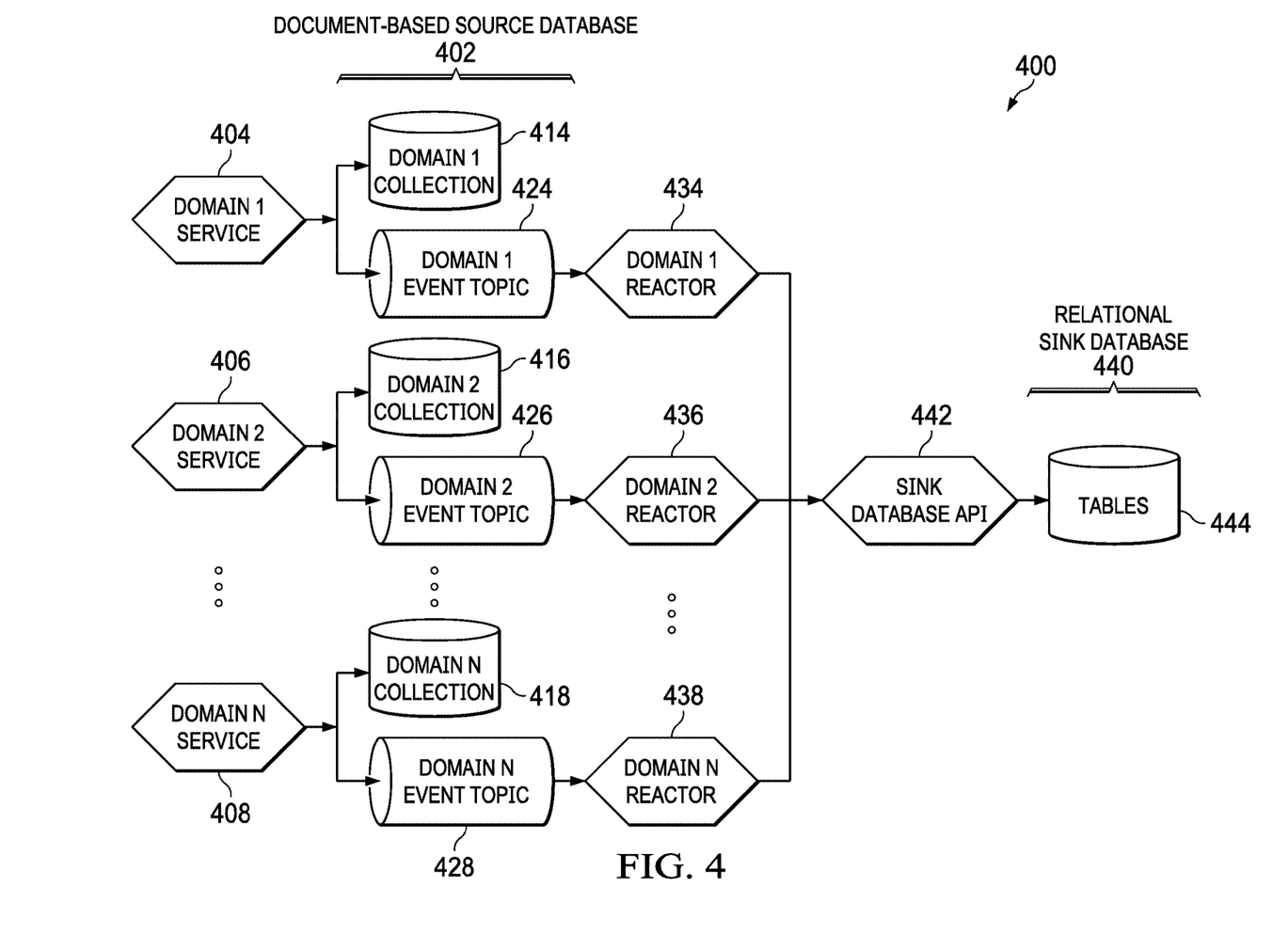
FIG. 4 is a block diagram illustrating the operation of a data synchronization system with a document-based database as the source and a relational database as the sink in accordance with an illustrative embodiment.

FIG. 4 is a block diagram illustrating the operation of a data synchronization system with a document-based database as the source and a relational database as the sink in accordance with an illustrative embodiment. The operation of system 400 shown in FIG. 4 is the reverse process of that shown in FIGS. 3A and 3B, accounting for internal differences between the different types of source databases.

As in the example shown in FIGS. 3A and 3B, example system 400 in FIG. 4 comprises three domains for ease of illustration. A number of domain services 404, 406, 408 that produce data changes in respective domain collections 414, 416, 418 within the document-based source database 402. In the present example, domain collections 414, 416, 418 might correspond to domain collections 362, 364, 366 in FIGS. 3A and 3B. The data changes also generate messages to their respective domain event topics 424, 426, 428 with the document-based source database 402.

Respective domain reactors 434, 436, 438 detect messages from the event topics 424, 426, 428 and synchronize the updated data in the relational sink database 440. This data synchronization occurs through a call to a sink database application programming interface (API) 442, which in turns updates sink database tables 444. In the present example, sink database tables 444 in FIG. 4 might correspond to source database tables 312 in FIGS. 3A and 3B.

The operational diagrams depicted in FIGS. 3 and 4 illustrate examples of how real-time, two-way data synchronization can be maintained between a relational database and a document-based database. It should be noted that the data synchronization can also be applied between similar types of databases. For example, the sink database 360 in FIGS. 3A and 3B might be a relational database. Similarly, document-based sink database 440 in FIG. 4 might be a document-based database.

FIG. 5 is a diagram of containerized applications which can be implemented with illustrative embodiments. As mentioned above, the synchronization and domain reactors, such as synchronization reactors 220 and domain reactor 240 in FIG. 2, can be implemented as Spring Boot® applications in Docker® containers. A reactor design is an event-based architecture for handling service requests delivered concurrently to a service handler by a number of inputs. The reactor implementation is separated from application-specific code, which allows applications components to be divided into modular, reusable parts.

Containers such as container 506 are abstractions of the application layer of a computer system 500. A container packages software code and all of its dependencies such as runtime, system tools, system libraries, and settings. A container isolates software from its environment to ensure that the software works uniformly.

Whereas virtual machines simulate hardware, a container virtualizes the host operating system 504 running on the system infrastructure 502. Multiple containers can run on a single operating system kernel and take up less system space than virtual machines. Each container can run as an isolated process in user space.

In the example shown in FIG. 5, container 506 contains a number of applications 508, 510, 512, which might be, e.g., synchronization reactors 332, 334, 336 or domain reactors 352, 354, 356 in FIGS. 3A and 3B. In an alternate embodiment (not shown), each application 508, 510, 512 can be containerized in a separate container.

In an embodiment, the applications 508, 510, 512 in container 506 are Spring Boot® applications that provide microservices. A microservice is a self-contained piece of functionality that is independently deployable and can be implemented using different programming languages, databases, hardware and software environments. A microservice architecture decomposes applications into smaller, modular components and is particularly well-suite for distributed, cloud-based service.

Figure 6:
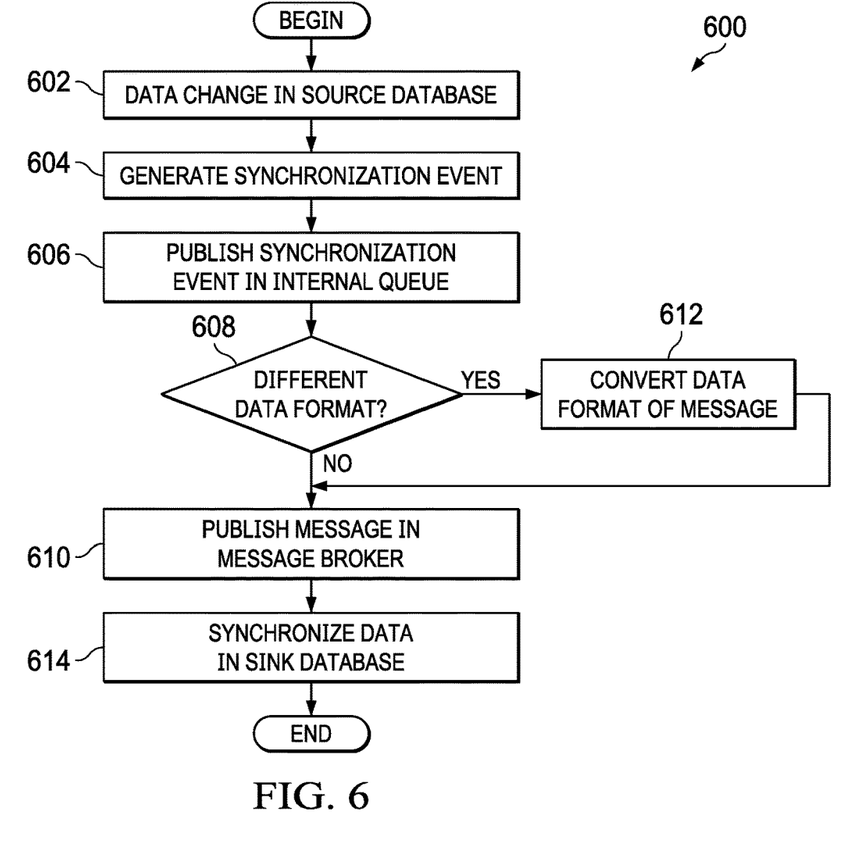
FIG. 6 is a flowchart illustrating a process for synchronizing data across databases in accordance with an illustrative embodiment.

FIG. 6 is a flowchart illustrating a process for synchronizing data across databases in accordance with an illustrative embodiment. Process 600 is an example method utilizing the data synchronization system configuration shown in FIGS. 2-5. Process 600 begins with a data change in the source database (step 602). The system then generates a synchronization event in response to this change in data in the source database (step 604). The system publishes the synchronization event as a message in a source database internal queue (step 606).

The system determines if the data in the source database is in a different data format than data in the sink database (step 608). If the data formats are the same for the source and sink databases, the system publishes the message in a message broker (step 610).

If the source database and sink database use different data formats, the system converts the data format of the message from the first format to the second format (step 612) before publishing the message in the message broker.

The system then synchronizes the data in a sink database according to the message in the message broker to match the change in data in the source database (step 614).

Figure 7:
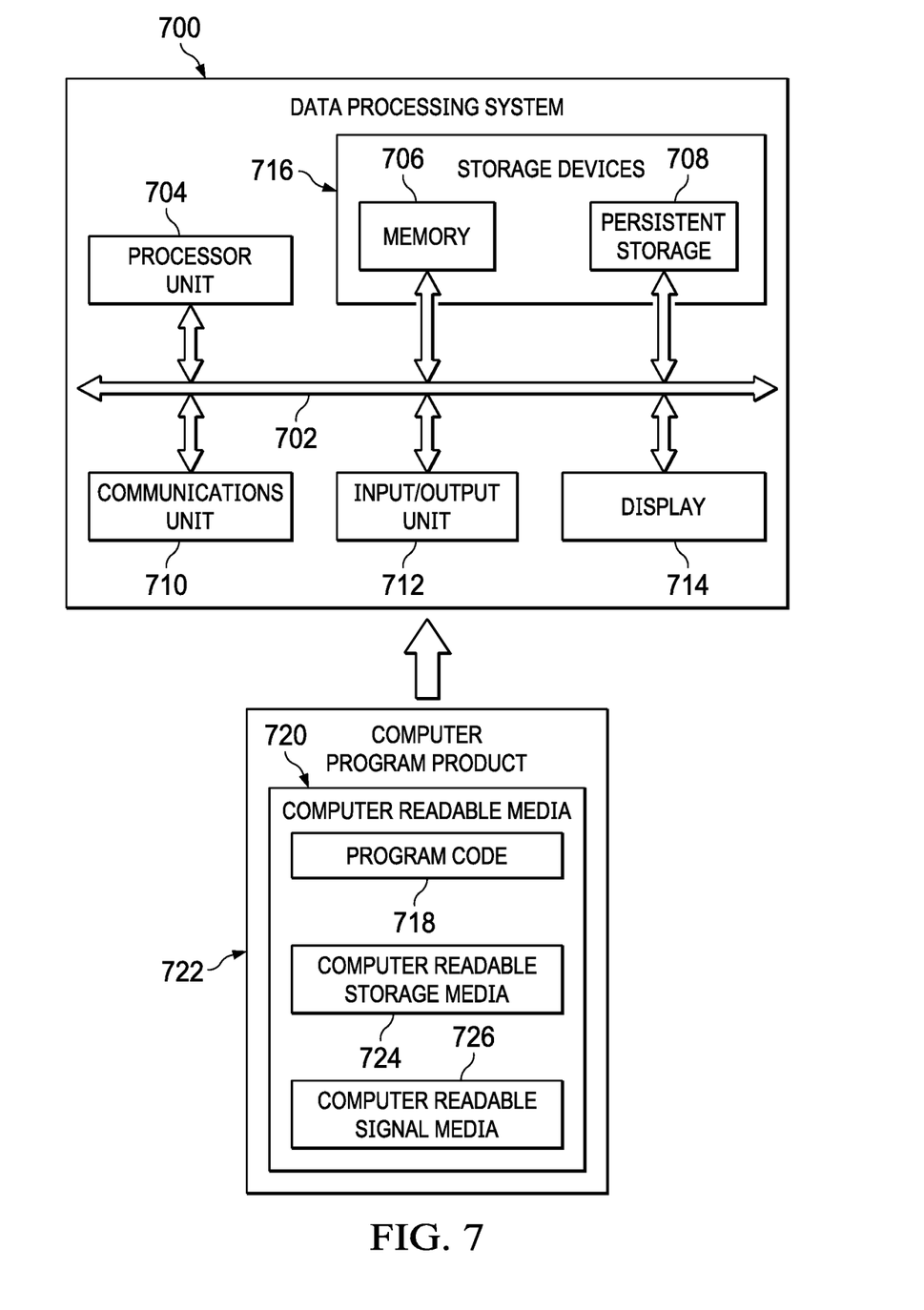
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement one or more computers in network data processing system 100 in FIG. 1. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general purpose central processing units (CPUs). In an alternate embodiment, processor unit 704 comprises a number of graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Alternatively, program code 718 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implement method of synchronizing data across databases, the method comprising:
   generating, by a number of processors, a synchronization event in response to a change in source data in a source database;
   publishing, by the number of processors, the synchronization event as a message in a source database internal queue;
   publishing, by the number of processors, the message in a message broker, wherein the message published in the source database internal queue in a first data format is converted to a second data format by a synchronization reactor before pushing the message to the message broker; and
   synchronizing, by the number of processors, sink data in a sink database according to the message in the message broker to match the change in source data in the source database.

2. The method of claim 1, wherein data is synchronized between the source database and sink database in real time as data changes occur.

3. The method of claim 1, wherein data in the source database and sink database are correlated by Universal Unique Identifiers (UUIDs).

4. The method of claim 1, further comprising dividing, by the number of processors, source data in the source database into domains that match a data model of the sink database.

5. The method of claim 1, wherein the message is published in the source database internal queue in a first data format and published in the message broker in a second data format.

6. The method of claim 1, wherein the synchronization reactor consumes the message from the source database internal queue and pushes the message to the message broker.

7. The method of claim 1, wherein a domain reactor consumes the message from the message broker and updates sink data in the sink database.

8. A system for synchronizing data across databases, the system comprising:
   a number of bus systems;
   a number of storage device connected to the number of bus systems, wherein the number of storage devices store program instructions; and
   a number of processors connected to the number of bus systems, wherein the number of processors execute the program instructions to:
      generate a synchronization event in response to a change in source data in a source database;
      publish the synchronization event as a message in a source database internal queue;
      publish the message in a message broker, wherein the message published in the source database internal queue in a first data format is converted to a second data format by a synchronization reactor before pushing the message to the message broker; and
      synchronize sink data in a sink database according to the message in the message broker to match the change in source data in the source database.

9. The system of claim 8, wherein data is synchronized between the source database and sink database in real time as data changes occur.

10. The system of claim 8, wherein data in the source database and sink database are correlated by Universal Unique Identifiers (UUIDs).

11. The system of claim 8, wherein the number of processors further execute program instructions to divide source data in the source database into domains that match a data model of the sink database.

12. The system of claim 8, wherein the message is published in the source database internal queue in a first data format and published in the message broker in a second data format.

13. The system of claim 8, wherein the synchronization reactor consumes the message from the source database internal queue and pushes the message to the message broker.

14. The system of claim 8, wherein a domain reactor consumes the message from the message broker and updates sink data in the sink database.

15. A computer program product for synchronizing data across databases, the computer program product comprising:
   a number of non-volatile computer readable storage media having program instructions embodied therewith, the program instructions executable by a number of processors to cause a number of computers to perform the steps of:
      generating a synchronization event in response to a change in source data in a source database;
      publishing the synchronization event as a message in a source database internal queue;

publishing the message in a message broker, wherein the message published in the source database internal queue in a first data format is converted to a second data format by a synchronization reactor before pushing the message to the message broker; and synchronizing sink data in a sink database according to the message in the message broker to match the change in source data in the source database.

16. The computer program product of claim 15, wherein data is synchronized between the source database and sink database in real time as data changes occur.

17. The computer program product of claim 15, wherein data in the source database and sink database are correlated by Universal Unique Identifiers (UUIDs).

18. The computer program product of claim 15, further comprising instructions for dividing source data in the source database into domains that match a data model of the sink database.

19. The computer program product of claim 15, wherein the message is published in the source database internal queue in a first data format and published in the message broker in a second data format.

20. The computer program product of claim 15, wherein the synchronization reactor consumes the message from the source database internal queue and pushes the message to the message broker.

21. The computer program product of claim 15, wherein a domain reactor consumes the message from the message broker and updates sink data in the sink database.

\* \* \* \* \*